United States Patent Office 2,991,319
Patented July 4, 1961

2,991,319
CONVERSION OF ORGANIC OXYGEN COMPOUNDS TO AROMATICS
William Judson Mattox, Baton Rouge, La., assignor to Esso Research and Engineering Company, a corporation of Delaware
No Drawing. Filed Apr. 7, 1959, Ser. No. 804,584
10 Claims. (Cl. 260—668)

The present invention relates to a process for converting organic oxygen compounds to aromatic compounds. More particularly, it concerns a method for making aromatic compounds, especially substituted aromatic compounds, from organic oxides by contacting the oxides with an alumina or silica-containing catalyst at elevated temperatures.

An object of this invention is to prepare aromatic compounds from a feed containing a substantial amount of an organic oxide by contacting said feed with an alumina or silica-containing catalyst at a temperature above about 250° F. Another object of the invention is to provide a process for producing aromatic compounds, particularly those which contain alkyl substituents.

It has been discovered that organic oxygen compounds, in which the oxygen is present in the form of an oxide or epoxide, can be converted to aromatic compounds by contacting said oxygen compounds with an alumina or silica-containing catalyst at elevated temperatures, i.e. 300 to 900° F.

The organic oxygen compounds which are suitable for the purposes of the invention contain at least 1 heterocyclic ring in which oxygen is the heteroatom, and a total of 3 to 12 carbon atoms. While the organic oxygen compounds containing heterocyclic rings having 3 to 4 members may be employed, e.g. propylene oxide-1,3, it is preferred to use compounds containing three-membered heterocyclic rings, such as those found in propylene oxide-1,2, butylene oxide-1,2, pentylene oxide-1,2, octylene oxide-1,2, etc. Moreover, it has been noted that oxygen compounds containing up to 6 carbon atoms are more reactive and produce higher yields of aromatic compounds. For this reason the lower molecular weight epoxy $C_3$ to $C_6$ alkane compounds, e.g. epoxypropane-1,2 (propylene oxide-1,2), are preferred.

In carrying out the invention, the organic oxygen compound, either alone or admixed with a suitable inert diluent, is contacted with particles of alumina or silica-containing catalyst at a temperature of about 300 to 900° F. under subatmospheric to superatmospheric pressures. The oxygen compound should be fed into the reaction zone containing the catalyst, if in fluidizable particle form, at a rate which is greater than 0.15 lb./lb. of catalyst per hour (w./w./hr.) to insure a substantial conversion of the oxygen compound to aromatics. If the catalyst is maintained in a fixed-bed, an adjustment in this minimum feed rate may be necessary depending upon the percentage of active oxygen compounds in the total feed to the reactor. The catalyst in the reaction zone is preferably in the form of a fixed or fluid bed. In a fixed bed operation the average particle size of the catalyst may be as great as ½″ or more, but is generally between about $\frac{1}{16}″$ and ¼″ in diameter. Where a fluid bed is employed, the catalyst is in the form of a finely divided solid which is fluidized by the lifting action of the gas rising through it. A portion of the solid particles, which have average sizes in the range of 20 to 100 microns, is continuously removed from the reaction zone and passed to a regeneration zone where, in the presence of an oxygen-containing gas such as air, a small percentage of carbonaceous deposit is removed from the catalyst before being recycled to the reaction zone. The fluid process is preferred because of the excellent temperature control which it affords. The catalyst particles therefore not only serve to promote the reaction but also assist in the removal of the heat produced by the exothermic reaction from the reaction zone. Moreover, the large surface area of the finely divided fluid bed, e.g. 100 to 500 square meters/gram, permits greater contact with the reactant. Other methods for contacting solid catalyst with vaporized reactants, such as in a transfer line, may be used. In any event, in the fluid operation the feed rate should be between about 0.2 and 2 w./w./hr. in order to obtain the highest selectivity and greatest conversion to aromatic compounds. The product stream, which contains water, intermediate compounds, unreacted oxide, and aromatic and substituted aromatic compounds, is passed through a separating means which removes the unreacted oxygen compounds and intermediate oxygen-containing substances boiling lower than the aromatic product. Part or all of the stream containing products boiling below the aromatic product may be recycled to the reaction zone. The recycle stream and feed stream may be cooled before introducing them into the reaction zone in order to maintain adequate heat control in that zone. The water remaining in the aromatic product may be removed by gravity separation.

While it is not essential to have an inert diluent in the reaction zone, it is usually advisable to have a substantial amount of a diluent such as a vaporizable hydrocarbon having about 4 to 10 carbon atoms, e.g. hexane, heptane, benzene, butane, etc., present in the reaction zone to assist in the dissipation of the heat of reaction. In lieu of a pure diluent, a partially oxidized hydrocarbon feed containing about 20 to 75 wt. percent organic epoxide or oxide may be employed. The paraffinic hydrocarbons in the partially oxidized feed are excellent diluents and prevent overheating of the catalyst.

While the catalyst may consist essentially of silica or alumina, it has been found that much greater selectivity is obtained when the catalysts contain a minor proportion of a group IA, IB, IIA, IIB, IVB, VB or VIB metal of the periodic chart of elements (pages 56–57 of Lange's Handbook of Chemistry, 8th edition), preferably in the form of an oxide. Where metals in groups IA, IB, IIA, IIB and IVB are employed in combination with the silica or alumina, it is generally desirable to have between about 1 to 35 wt. percent of their oxides in the catalyst; and when metals in groups VB and VIB of the periodic chart are present their oxides should comprise about 5 to 20 wt. percent of the catalyst composition. For instance, an outstanding catalyst is a dehydrated sodium aluminosilicate catalyst containing about 32 wt. percent alumina, 20 wt. percent sodium oxide and 48 wt. percent silica. Other excellent catalysts include aluminosilicates containing minor proportions of zinc, lithium and sodium, as well as silica base catalysts containing minor amounts of boron oxide or alumina, and alumina base catalysts containing minor amounts of molybdenum, chromium, and vanadium oxides. The preferred silica and alumina catalysts are those containing groups IA and VIB metal oxides.

The catalysts may be either natural or synthetic. Suitable natural catalysts include those of the zeolite group and feldspar group. Synthetic catalysts may be prepared by techniques which are well known in the art for impregnating alumina and silica catalysts with various metallic substances. For instance, silica gel may be impregnated with an aqueous solution of an aluminum salt or the silica and aluminum may be coprecipitated by the addition of aluminum sulfate to a solution of sodium silicate. The solid may be washed and heated to between 600 and 1000° F. to prepare a crystalline catalyst which preferably has pores which are 6 to 15 A. in diameter.

Alumino-silicates of high activity may be prepared by mixing and heating sodium aluminate and sodium silicate, preferably metasilicate, under carefully controlled conditions to produce a crystalline product which is subsequently dehydrated under conditions to preserve the crystalline structure. The sodium content of the crystalline aluminosilicate may, if desired, be replaced by effecting ion exchange with an appropriate metal salt such as those of zinc, silver, lithium, etc. The metal ion influences the size of the pore openings, as does the ratio of the reagents and the reaction conditions. The catalyst may be prepared from a sodium silicate having a high ratio of soda to silica. The ratio is at least 0.8/1, and may be as high as 2/1. Preferably, however, the ratio is 1/1, and the desired reagent is sodium metasilicate.

Sodium aluminates having any ratio of soda to alumina in the range of 1/1 to 3/1 may be employed; however, a sodium aluminate having a high ratio of soda to alumina is preferred, and a sodium aluminate having the ratio 1.5/1 $Na_2O/Al_2O_3$ is particularly desirable. The amounts of sodium silicate solution and sodium aluminate solutions are such that the ratio of silica to alumina in the final mixture is at least 3/1 and preferably about 4/1 to 10/1.

The method of mixing the sodium metasilicate and sodium aluminate solutions should be carried out in a manner allowing formation of a precipitate having a uniform composition. A preferred method is to add the sodium aluminate to the sodium metasilicate at ambient temperatures using rapid and efficient agitation to make a homogeneous paste. Thereafter the mixture is heated to about 180° to 215° F. for an extended period of an hour or longer to ensure crystallization in the crystal form necessary to produce an active catalyst. It has been found that the heat soaking period is essential to produce the desired product, which has a pore opening of about 13 A. The final product, after dehydration, has an empirical formula $Na_2O \cdot Al_2O_3 \cdot 2.7 \pm 0.5\ SiO_2$. It is preferably activated at 400° to 1000° F.

The process of manufacture may be modified in various ways. Thus, it may be desirable to base-exchange the recovered zeolite with another metal ion. The base exchanged zeolite has the formula $$\frac{Me_2O}{n} \cdot Al_2O_3 \cdot 2.7 \pm 0.5 SiO_2$$

wherein Me is the metal cation, and $n$ is its valence. Where this is done, the filter cake of sodium aluminosilicate may be base-exchanged with a solution of a calcium salt or other salt solutions before drying, though this is not essential. The crystalline precipitate of sodium aluminosilicate may be dried, activated by heating to about 700° to 900° F. and used as such, or if desired, the dried aluminosilicate may be base exchanged with a salt solution. Base exchanging may be carried out by treating the wet precipitate in the filter with a salt solution, or by reslurrying the precipitate in a salt solution.

In a preferred embodiment of the invention, a $C_3$ to $C_6$ epoxy compound is contacted with a crystalline sodium alumino-silicate catalyst in the presence of about 2 to 4 moles of an inert paraffinic diluent per mole of said epoxide compound at a temperature of 400 to 850° F. and under a pressure ranging from atmospheric to 300 p.s.i.a. The feed is introduced into the reaction zone, which contains the aforementioned catalyst in a fluidized state, at a rate of 0.2 to 2 w./w./hr. and a product is recovered which contains a major proportion of aromatic compounds that are predominantly alkylated benzenes. The catalyst bed is maintained in a fluidized state by means of the vaporized feed and paraffinic diluent or by the addition of nitrogen gas, etc. to provide an upward velocity of the gases within the range of about 0.3 to 5.0 feet per second.

The aromatic substances prepared according to the present invention may contain up to 3 unsaturated rings, although when lower molecular weight oxygenated compounds comprise the feed stream, the principal products are alkyl substituted benzenes, such as toluene, xylene, durene and mesitylene. If polycyclic aromatics are produced, they also are usually alkylated aromatics and will comprise primarily such compounds as alkyl naphthalenes, indenes, anthracenes, phenanthrenes, etc.

The following examples are given to more clearly demonstrate how the process of the present invention may be carried out.

EXAMPLE 1

Portions of crystalline sodium aluminosilicate catalyst having 13 A. pores were treated with zinc, silver and lithium salts in a metal exchange reaction and then used as catalysts to convert propylene oxide-1,2 to aromatic compounds. The sodium aluminosilicate was prepared in an aqueous medium at pH of 10 to 12 and calcined at a maximum temperature of 850° F. Pure propylene oxide was introduced into the reaction zone, which contained a fixed bed of the specified catalyst that had an average particle size of 1/16" x 1/8–3/16", at 525° F. and under atmospheric pressure. The data set forth in Table I show the effect of the aforementioned catalysts on the reaction product.

Table I
CONVERSION OF PROPYLENE OXIDE-1,2 TO AROMATICS WITH ALUMINOSILICATE CATALYSTS

| Exchange Metal in Catalyst | Amount of Exchange Metal in Catalyst, Weight Percent | Feed Rate, V.l/V./Hr. | Propylene Oxide Conversion, Percent | Selectivity to Aromatics, percent | Aromatic Content of Oil Product, Percent |
|---|---|---|---|---|---|
| Zinc | 13 | 0.5 | 55 | 36 | 61 |
| Silver | 34 | 0.5 | 100 | 16 | 43 |
| Lithium | 3 | 0.5 | 65 | 28 | 96 |
| Sodium | 20 | 0.5 | 68 | 63 | 80 |
| Sodium (Amorphous) | 10 | 0.3 | 48 | 22 | 12 |

The data demonstrate that while crystalline aluminosilicate catalysts alone are effective in converting propylene oxide to aromatics, greater conversions and higher selectivity are obtained when minor amounts of alkali metals are present in the crystalline, porous catalyst. The most suitable of the catalysts studied was the crystalline sodium aluminosilicate which had the highest selectivity of the catalysts evaluated; on the other hand, the noncrystalline sodium aluminosilicate produced the lowest concentration of the aromatics in the oil produced by the reaction.

EXAMPLE 2

A number of silica-containing catalysts were evaluated in a fixed bed operation identical with that described in Example 1. The data obtained in these runs are set forth in Table II.

Table II
CONVERSION OF PROPYLENE OXIDE TO AROMATICS WITH SILICA AND SILICA-CONTAINING CATALYSTS

| Catalyst | Feed Rate, V.l/V./Hr. | Propylene Oxide Conversion, Percent | Selectivity to Aromatics, Percent | Aromatic Content of Oil Product, Percent |
|---|---|---|---|---|
| Silica | 0.6 | 96 | 23 | 29 |
| 87 wt. percent Silica, 13 wt. percent Alumina | 0.5 | 59 | 56 | 63 |
| 90 wt. percent Silica, 10 wt. percent Zirconium Oxide | 0.4 | 74 | 26 | 43 |
| 70 wt. percent Silica, 30 wt. percent Magnesium Oxide | 0.5 | 62 | 32 | 63 |
| 60 wt. percent Silica, 35 wt. percent Alumina, 5 wt. percent Boron Trioxide | 0.4 | 73 | 48 | 70 |

Of the catalysts evaluated, the silica-alumina and silica-alumina-boria produced the most favorable results. The water-washed oil products contained 85 to 90% aromatics. Silica alone and composites of silica with magnesia and zirconia were less effective because of low selectivity, rapid decline in activity or low concentration of aromatics in the oil product.

EXAMPLE 3

Example 1 was repeated with alumina base catalysts. The data obtained in these runs are set forth in Table III.

*Table III*

CONVERSION OF PROPYLENE OXIDE TO AROMATICS WITH ALUMINA BASE CATALYSTS

|  | Catalysts | |
| --- | --- | --- |
|  | Alumina | 91% Alumina, 9% Molybdena |
| Feed Rate, V.L./V./Hr. | 0.4 | 0.4 |
| Propylene Oxide Conversion, Percent | 71 | 73 |
| Selectivity to Aromatics, Percent | 69 | 82 |
| Aromatic Content of Oil Product, Percent | 88 | 75 |

While both of the alumina catalysts studied in the fixed bed operation had about the same activity, the molybdena-alumina catalyst had a higher selectivity for aromatics and therefore is preferred.

EXAMPLE 4

The conversion of propylene oxide to aromatics with a catalyst consisting of 87% silica and 13% alumina was compared in both fixed bed and fluid bed operations. In each case the temperature was 525° F. and the pressure was atmospheric. The average particle size of the catalyst in the fixed bed and fluid bed were 1/16" x 1/8"-3/16" pellets and a powder within the range of 100 to 400 mesh, respectively. Conditions of the runs and the product data obtained are set forth in Table IV.

*Table IV*

CONVERSION OF PROPYLENE OXIDE TO AROMATICS WITH ALUMINOSILICATE CATALYST

| Run No | 1 | 2 | 3 |
| --- | --- | --- | --- |
| Type Operation | Fluidized-Bed | | Fixed-Bed |
| Feed Rate, W./W./Hr. | 0.15 | 0.31 | 0.76 |
| Propylene Oxide, Conv., Percent | 95+ | 73 | 59 |
| Selectivity to Aromatics, Percent | 0 | 84 | 56 |
| Aromatic Content of Oil Product, Percent: | | | |
| Raw Oil | 0 | 87 | 63 |
| Water-Washed Oil | 0 | 90 | 86 |

Since the conversion of organic oxides to aromatics is highly exothermic, improved selectivity is obtained with a fluidized catalyst operation because of the more uniform temperature distribution which this type of catalyst bed affords. It prevents localized overheating and therefore catalyst degradation. It is important to note that in run 1, in which the feed rate was low, no aromatics were found in the oil product. Thus, it is apparent that the feed rate should be above 0.15 w./w./hr. and preferably at least 0.2 w./w./hr. in order to obtain substantial yields of aromatic compounds.

The water-washed oil product obtained in run 3 in this example was analyzed and it was found that it contained 14% nonaromatics, 10% $C_8$, 10% $C_9$, 31% $C_{10}$, 21% $C_{11}$, and 14% $C_{12}$ aromatics. The $C_8$ aromatic fraction consisted of about 50% ethyl benzene and 50% xylenes, the latter being almost entirely meta- and para-xylenes. The $C_9$ fraction contained about equal amounts of mesitylene and pseudocumene. The $C_{10}$ aromatic fraction consisted principally of diethyl- and tetramethyl benzenes.

EXAMPLE 5

Example 4 is repeated using pentylene oxide-1,2 in place of propylene oxide-1,2.

EXAMPLE 6

Example 4 is repeated using a partially oxidized $C_3$ paraffinic hydrocarbon in place of propylene oxide-1,2.

Resort may be had to various modifications and variations of the present invention without departing from the spirit of the discovery or the scope of the appended claims.

What is claimed is:

1. A process for converting organic oxygen compounds to aromatic compounds which comprises contacting an organic oxygen compound having a heterocyclic ring containing 3 to 4 members in which oxygen is the hereo atom with a catalyst containing a substance selected from the group consisting of alumina, crystalline aluminosilicates, silica and mixtures thereof at temperatures above 250° F.

2. A process for converting organic oxygen compounds to alkyl-substituted aromatic compounds which comprises contacting epoxy compounds containing 3 to 12 carbon atoms in which the epoxy oxygen atom is in a 3 member heterocyclic ring with a catalyst containing a substance selected from the group consisting of alumina, crystalline aluminosilicates, silica and mixtures thereof at a temperature above 250° F.

3. A process for converting propylene oxide-1,2 to alkyl-substituted benzene compounds which comprises contacting said propylene oxide-1,2 with a catalyst containing a substance selected from the group consisting of alumina, crystalline aluminosilicates, and silica and mixtures thereof at a feed rate greater than 0.15 w./w./hr. at temperatures of about 300 to 900° F. and under pressures ranging from subatmospheric to 300 p.s.i.a.

4. A process according to claim 3 in which the catalyst in an alumina base catalyst containing a minor proportion of a metal selected from groups VB and VIB.

5. A process according to claim 3 in which the catalyst is a silica base catalyst containing a minor proportion of a metal selected from groups IA, IB, IIA, IIB and IVB.

6. A process according to claim 3 in which the catalyst is an alumina base catalyst containing a minor proportion of molybdena.

7. A process according to claim 2 in which the epoxy compounds are epoxy $C_3$ to $C_6$ alkanes.

8. A process for converting oxygen compounds to aromatic compounds which comprises contacting a feed containing propylene oxide-1,2 with a crystalline sodium aluminosilicate in a reaction zone at a temperature of 400 to 850° F. under a pressure of up to 300 p.s.i.a. and at a feed rate greater than 0.15 w./w./hr.

9. A process according to claim 8 in which the feed rate is between 0.2 and about 2 w./w./hr.

10. A process for converting propylene oxide-1,2 to alkyl-substituted aromatic compounds which comprises contacting said propylene oxide-1,2 with a catalyst consisting of crystalline sodium aluminosilicate containing a minor proportion of zinc at temperatures of about 300 to 900° F. and under pressures ranging from subatmospheric to 300 p.s.i.a.

References Cited in the file of this patent

UNITED STATES PATENTS

| 1,728,732 | Jaeger | Sept. 17, 1929 |
| 2,737,535 | Taylor | Mar. 6, 1956 |
| 2,781,407 | Schwerling | Feb. 12, 1957 |